J. A. ADOLFSON.
SPRING WHEEL.
APPLICATION FILED JAN. 21, 1915.
1,160,119. Patented Nov. 16, 1915.
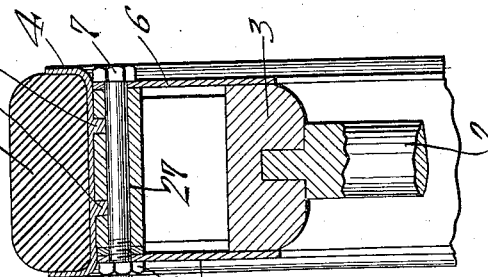
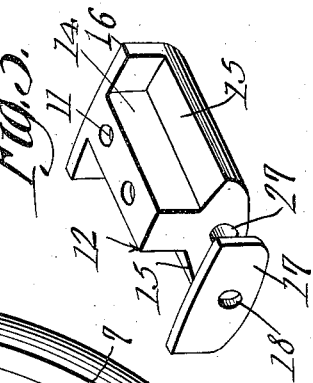
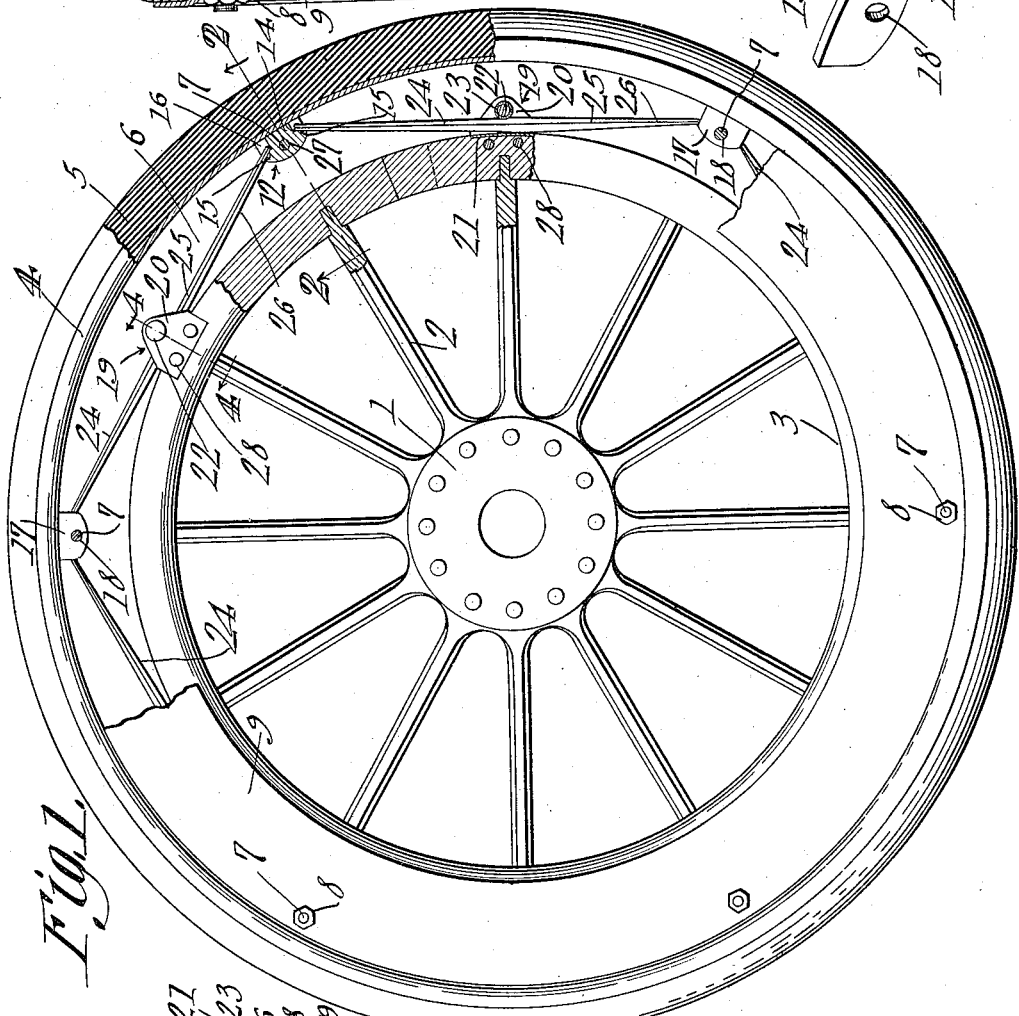
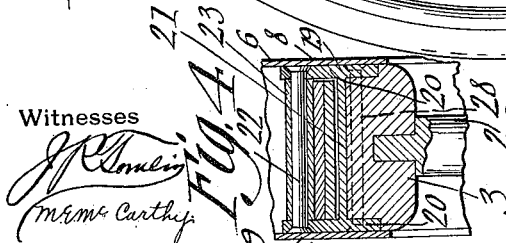
Witnesses
J. A. Adolfson Inventor
by C. A. Snow & Co.
Attorneys

UNITED STATES PATENT OFFICE.

JOHN AXEL ADOLFSON, OF DULUTH, MINNESOTA.

SPRING-WHEEL.

1,160,119.              Specification of Letters Patent.       Patented Nov. 16, 1915.

Application filed January 21, 1915. Serial No. 3,544.

*To all whom it may concern:*

Be it known that I, JOHN A. ADOLFSON, a citizen of the United States, residing at Duluth, in the county of St. Louis and State of Minnesota, have invented a new and useful Spring-Wheel, of which the following is a specification.

The device forming the subject matter of this application is a spring wheel and the invention, in its broadest aspect, aims to provide a device of this type in which pneumatic elements subject to puncture may be dispensed with.

Specifically, the invention aims to improve the springs which support the rim yieldingly on the felly, and to provide novel means for assembling the springs both with the felly and with the rim.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in side elevation, parts being broken away and sectioned; Fig. 2 is a cross section taken on the line 2—2 of Fig. 1; Fig. 3 is a perspective showing one of the rim carried lugs; Fig. 4 is a cross section on the line 4—4 of Fig. 1.

In carrying out the present invention there is provided a hub 1 from which radiate spokes 2 supporting a felly 3.

Surrounding the felly 3 but spaced therefrom is a rim 4 which may carry a tire 5 of any desired construction. The rim 4 embodies a fixed side plate 6 adapted to move in slidable contact with one edge of the felly 3. Through the fixed side plate 6 pass bolts 7 or other securing elements, the nuts on the bolts 7 being indicated by the reference character 8. The bolts 7 pass through a removable side plate 9 which is in slidable contact with one edge of the felly 3 and the nuts 8 serve to hold the removable side plate 9 in place.

The bolts 7 pass through lugs, denoted generally by the numeral 12, the opening in the lug through which the bolt 7 passes being denoted by the reference character 27. The lug 12 comprises a body portion 14 and shoulders 15 projecting beyond the body 14 circumferentially of the wheel, the shoulders 15 preferably being inclined as clearly shown in Figs. 1 and 3. The rim 4 may be provided with bosses 10 received in openings 11 formed in the body portion 14 of the lug 12 and thus the lug is prevented from moving circumferentially of the felly 3. Each lug 12 embodies a fixed end wing 16 formed integrally with the body 14 and with the shoulders 15. A removable end wing 17 is shown and the same is disposed between one end of the lug 12 and the removable side plate 9, the removable end wing 17 being provided with an opening 18 through which the bolt 7 passes.

Mounted on the felly 3 between the lugs 12 are spring retainers 19, each of which is of H-shape and embodies flanges 20 and a web 21 connecting the flanges. The flanges 20 are straddled on the felly 3 and preferably are counter-sunk into the sides of the felly, as clearly shown in Fig. 1, so as to permit the side plates 6 and 9 to reciprocate in contact with the felly, without forming lateral openings between the side plates and the felly, through which openings dirt might find its way within the contour of the structure. Securing elements 28 pass through the flanges 20 and serve to hold the retainers 19 on the felly 3. Beyond the periphery of the felly 3, the flanges 20 of each retainer are united by a transverse element or axle 22 upon which is journaled for rotation a tubular roller 23.

The invention comprises a plurality of springs, the springs being shown as comprising two leaves 24, although a greater or less number of leaves may be employed if deemed expedient. The adjacent or contacting faces of the leaves 24 are straight and flat as shown at 25, while the outer or remote faces of the leaves 24 converge as they approach the ends of the springs, thus to make the springs thicker in their middle portions than at their ends, the taper of the springs being indicated at 26.

The springs are engaged in their intermediate portions beneath the rollers 23 and thus are held in tangential relation with respect to the felly 3. The ends of the springs rest upon the shoulders 15 of adjoining lugs 12.

Noting Fig. 1 of the drawings it will be observed that the springs extend in a straight line between spaced points on the rim 4 and are disposed tangentially of the felly 3. Owing to this construction the springs will yield with equal facility adjacent their ends, either in an outward direction or in an inward direction.

The body portions 14 of the lugs 12 afford terminal abutments for the springs, so that the springs are prevented from moving endwise. Further, the springs at their ends cannot move laterally, owing to the presence of the end wings 16 and 17.

In order to take down the wheel, the nuts 8 are removed and the side plate 9 is detached, after which, the wings 17 may be removed. Thereupon the rim 4 may be moved sidewise, the ends of the springs sliding off the shoulders 15, and after this operation has been carried out, the springs may be moved endwise so as to disengage the same from beneath the rollers 23.

Having thus described the invention, what is claimed is:—

In a spring wheel, a felly; a rim; lugs carried by the rim, each lug including a body, shoulders disposed on opposite sides of the body, circumferentially of the rim, and a fixed end wing; a removable end wing; a removable side plate in slidable contact with the felly; securing elements uniting the removable side plate and the removable wing with the lug; springs each extended in a straight line between the body portions of adjoining lugs, the ends of the springs resting on the shoulders and being held against lateral movement by the wings; and felly carried means for engaging the intermediate portions of the springs.

In testimony that I claim the foregoing as my own, I have hereto affixed my signature in the presence of two witnesses.

JOHN AXEL ADOLFSON.

Witnesses:
W. DUNDESHIRE,
J. E. COOLEY.

Copies of this patent may be obtained for five cents each, by addressing the "Commissioner of Patents, Washington, D. C."